United States Patent
Turner et al.

(10) Patent No.: US 12,399,601 B2
(45) Date of Patent: Aug. 26, 2025

(54) SCENE INFORMATION ACCESS FOR ELECTRONIC DEVICE APPLICATIONS

(71) Applicant: Apple Inc., Cupertino, CA (US)

(72) Inventors: James T. Turner, San Jose, CA (US); Peter L. Hajas, Lafayette, CO (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/608,826

(22) Filed: Mar. 18, 2024

(65) Prior Publication Data

US 2024/0220069 A1    Jul. 4, 2024

Related U.S. Application Data

(63) Continuation of application No. 18/125,113, filed on Mar. 22, 2023, now Pat. No. 11,972,088, which is a continuation of application No. 17/980,511, filed on Nov. 3, 2022, now abandoned.

(60) Provisional application No. 63/281,600, filed on Nov. 19, 2021.

(51) Int. Cl.
  *G06F 3/04815*  (2022.01)
  *G06F 3/01*  (2006.01)
  *G06T 19/00*  (2011.01)

(52) U.S. Cl.
  CPC .......... *G06F 3/04815* (2013.01); *G06F 3/013* (2013.01); *G06F 3/017* (2013.01); *G06T 19/006* (2013.01)

(58) Field of Classification Search
  CPC ...... G06F 3/04815; G06F 3/017; G06F 3/013; G06F 9/451; G06F 3/011; G06T 19/006
  See application file for complete search history.

(56) References Cited

U.S. PATENT DOCUMENTS

| | | | |
|---|---|---|---|
| 7,561,143 | B1 | 7/2009 | Milekic |
| 9,424,239 | B2 | 8/2016 | Dunn |
| 10,665,019 | B2 * | 5/2020 | Hildreth .............. G06F 3/04815 |
| 11,017,608 | B2 | 5/2021 | Paul |
| 11,195,323 | B2 | 12/2021 | Oriol |
| 11,270,601 | B2 | 3/2022 | Yu |
| 11,328,484 | B2 | 5/2022 | Powderly |
| 11,562,525 | B2 | 1/2023 | Joseph |

(Continued)

FOREIGN PATENT DOCUMENTS

| | | |
|---|---|---|
| CN | 111178305 A | 5/2020 |
| CN | 112835445 A | 5/2021 |
| CN | 113544748 A | 10/2021 |

OTHER PUBLICATIONS

International Search Report and Written Opinion from PCT/US2022/049631, dated Mar. 2, 2023, 11 pages.

(Continued)

*Primary Examiner* — Vinh T Lam
(74) *Attorney, Agent, or Firm* — BAKERHOSTETLER

(57) ABSTRACT

Aspects of the subject technology provide for constrained access to scene information by applications running on an electronic device. A system process of an electronic device may assign a region of a physical environment to an application. A user interface of the application may be displayed in the assigned region. The system process may provide scene information and/or user information to the application only when the scene information and/or user information occurs and/or originates within the assigned region, in one or more implementations.

20 Claims, 6 Drawing Sheets

(56) References Cited

U.S. PATENT DOCUMENTS

| | | |
|---|---|---|
| 11,599,237 B2 | 3/2023 | Holz |
| 11,632,679 B2 | 4/2023 | Shveki |
| 11,776,318 B2 | 10/2023 | Bhushan |
| 11,915,377 B1 * | 2/2024 | Bhushan ................ H04L 67/131 |
| 11,972,088 B2 * | 4/2024 | Turner .................... G06F 9/451 |
| 12,112,435 B1 * | 10/2024 | Bhushan ................ H04N 7/157 |
| 2013/0178257 A1 | 7/2013 | Langseth |
| 2016/0048230 A1 | 2/2016 | Shimoda |
| 2017/0337742 A1 | 11/2017 | Powderly |
| 2020/0096802 A1 | 3/2020 | Busch |
| 2021/0065436 A1 | 3/2021 | Oriol |
| 2021/0125414 A1 | 4/2021 | Berkebile |
| 2021/0210102 A1 | 7/2021 | Huh |
| 2021/0327146 A1 | 10/2021 | Buerli |
| 2021/0350634 A1 | 11/2021 | Major et al. |
| 2022/0035508 A1 * | 2/2022 | Holland .................. G06F 3/011 |
| 2022/0103969 A1 | 3/2022 | Drummond |
| 2023/0092103 A1 * | 3/2023 | Puyol ..................... G06F 3/011 |
| | | 715/205 |

OTHER PUBLICATIONS

European Office Action from European Patent Application No. 22826747.2, dated Feb. 13, 2025, 6 pages.

* cited by examiner

SCENE INFORMATION ACCESS FOR ELECTRONIC DEVICE APPLICATIONS

CROSS REFERENCE TO RELATED APPLICATIONS

This application is a continuation of U.S. patent application Ser. No. 18/125,113, entitled "Scene Information Access for Electronic Device Applications," filed on Mar. 22, 2023, which is a continuation of U.S. patent application Ser. No. 17/980,511, entitled "Scene Information Access for Electronic Device Applications," filed on Nov. 3, 2022, which claims the benefit of priority to U.S. Provisional Application No. 63/281,600, entitled "Scene Information Access for Electronic Device Applications," filed on Nov. 19, 2021, the disclosure of each of which is hereby incorporated herein in its entirety.

TECHNICAL FIELD

The present description relates generally to electronic devices including, for example, scene information access for electronic device applications.

BACKGROUND

Extended reality technology aims to bridge a gap between virtual environments and a physical environment by providing a view of the physical environment that is extended with electronic information. As a result, the electronic information appears to be part of the physical environment as perceived by a user.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
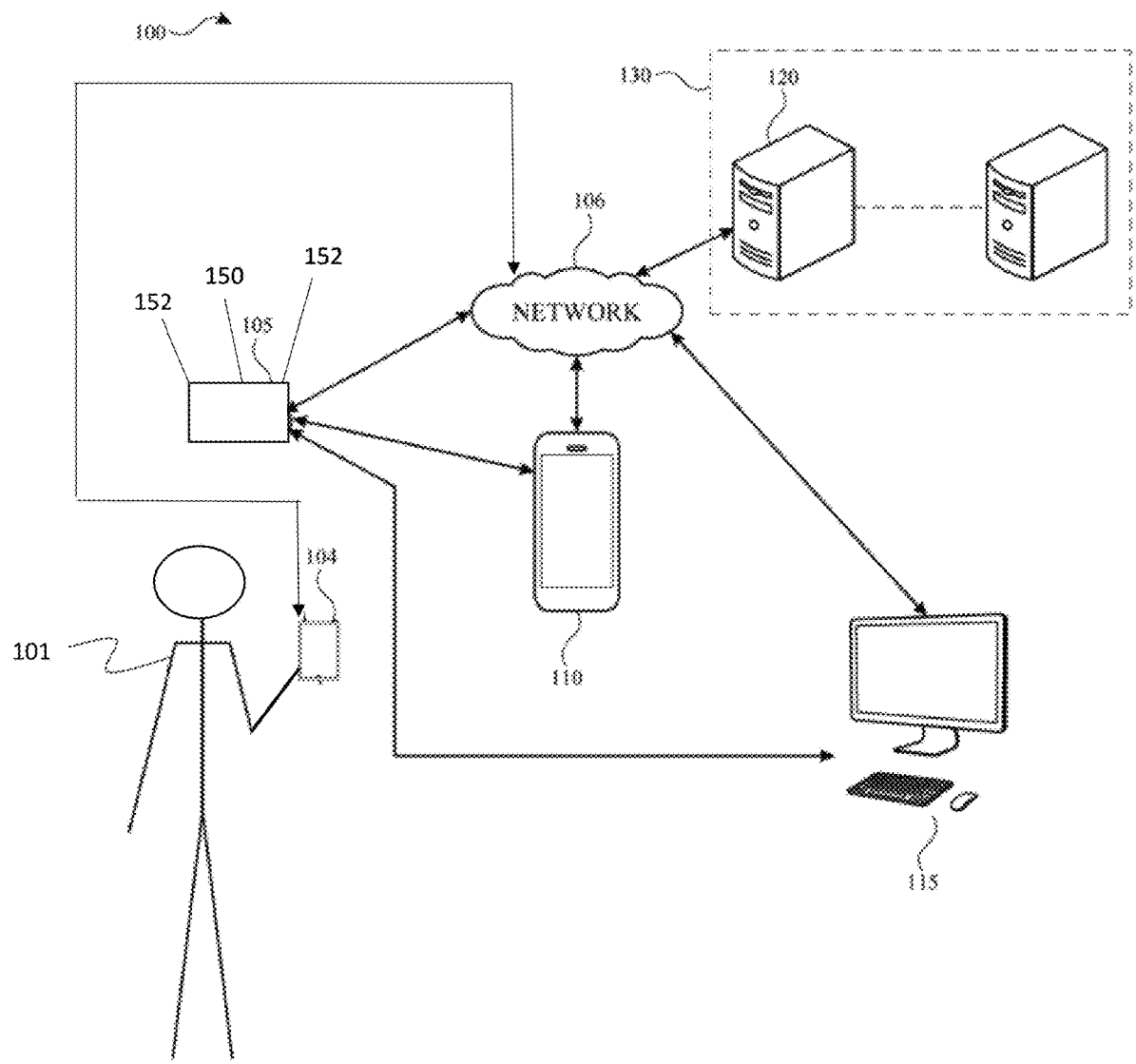
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein provide constrained scene information to an electronic device application that operates based on scene information. For example, in order to allow an application to operate based on scene information for a physical environment (e.g., information about the physical contents of the physical environment) without allowing the application access to the entirety of the scene information, a system process of an electronic device may only provide subset of the scene information to the application. This can be helpful, for example, in protecting the privacy of a user of the electronic device and/or other people in and/or associated with the physical environment.

The subset of the scene information may be a subset of the scene information that corresponds to a portion of the physical environment in which a user interface (UI) of the application is displayed (e.g., a three-dimensional region around the apparent location of the UI). For example, scene information corresponding to other portions of the physical environment may be obtained by the system process and not provided to the application. The system process may also constrain user information that is provided to the application, such as to a subset of the user information that occurs within the portion of the physical environment in which the UI appears to be displayed. For example, gesture inputs and/or gaze locations that occur within that portion of the physical environment may be provided to the application, and the application may be prevented from receiving gesture inputs and/or gaze locations that occur outside that portion of the physical environment. In one or more implementations, the scene information and/or user information that is available to an application can contract or expand if the application's assigned volume changes accordingly, such that, for example, an application may be given access to all scene information in a use case in which the user interface of the application is expanded to a full-screen mode.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, an electronic device 110, an electronic device 115, and a server 120. For explanatory purposes, the system architecture 100 is illustrated in FIG. 1 as including the electronic device 105, the electronic device 110, the electronic device 115, and the server 120; however, the system architecture 100 may include any number of electronic devices and any number of servers or a data center including multiple servers.

The electronic device 105 may be smart phone, a tablet device, or a wearable device such as a head mountable portable system, that includes a display system capable of presenting a visualization of an extended reality environment to a user 101. The electronic device 105 may be powered with a battery and/or any other power supply. In an example, the display system of the electronic device 105 provides a stereoscopic presentation of the extended reality environment, enabling a three-dimensional visual display of a rendering of a particular scene, to the user. In one or more implementations, instead of, or in addition to, utilizing the electronic device 105 to access an extended reality environment, the user may use an electronic device 104, such as a tablet, watch, mobile device, and the like.

The electronic device 105 may include one or more cameras such as camera(s) 150 (e.g., visible light cameras, infrared cameras, etc.) Further, the electronic device 105 may include various sensors 152 including, but not limited to, cameras, image sensors, touch sensors, microphones, inertial measurement units (IMU), heart rate sensors, temperature sensors, Lidar sensors, radar sensors, sonar sensors, GPS sensors, Wi-Fi sensors, near-field communications sensors, etc.) Moreover, the electronic device 105 may include hardware elements that can receive user input such as hardware buttons or switches. User input detected by such sensors and/or hardware elements correspond to various input modalities for interacting with virtual content displayed within a given extended reality environment. For example, such input modalities may include, but not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. The electronic device 105 may also detect and/or classify physical objects in the physical environment of the electronic device 105.

The electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power limitations of the electronic device 105 such as available battery power of the device. In response to power limitations, the electronic device 105 may deactivate certain sensors within the device itself to preserve battery power.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the extended reality environment in a real-time manner. In an example, the electronic device 105 provides a rendering of a scene corresponding to the extended reality environment that can be perceived by the user and interacted with in a real-time manner. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The electronic device 105 may also detect events that have occurred within the scene of the extended reality environment. Examples of such events include detecting a presence of a living being such as a person or a pet, a particular person, entity, or object in the scene. Detected physical objects may be classified by electronic device 105, electronic device 110, and/or electronic device 115 and the location, position, size, dimensions, shape, and/or other characteristics of the physical objects can be used to provide physical anchor objects for an XR application generating virtual content, such as a UI of an application, for display within the XR environment.

It is further appreciated that the electronic device 110 and/or the electronic device 115 can also generate such extended reality environments either working in conjunction with the electronic device 105 or independently of the electronic device 105.

The network 106 may communicatively (directly or indirectly) couple, for example, the electronic device 105, the electronic device 110 and/or the electronic device 115 with the server 120 and/or one or more electronic devices of one or more other users. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in an extended reality environment. In one or more implementations, the electronic device 110 may include a touchpad. In FIG. 1, by way of example, the electronic device 110 is depicted as a mobile smartphone device with a touchscreen. In one or more implementations, the electronic device 110, the electronic device 104, and/or the electronic device 105 may be, and/or may include all or part of, the electronic system discussed below with respect to FIG. 6. In one or more implementations, the electronic device 110 may be another device such as an Internet Protocol (IP) camera, a tablet, or a peripheral device such as an electronic stylus, etc.

The electronic device 115 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 6.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an implementation, the server 120 may function as a cloud storage server that stores any of the aforementioned extended reality content generated by the above-discussed devices and/or the server 120.

Figure 2:
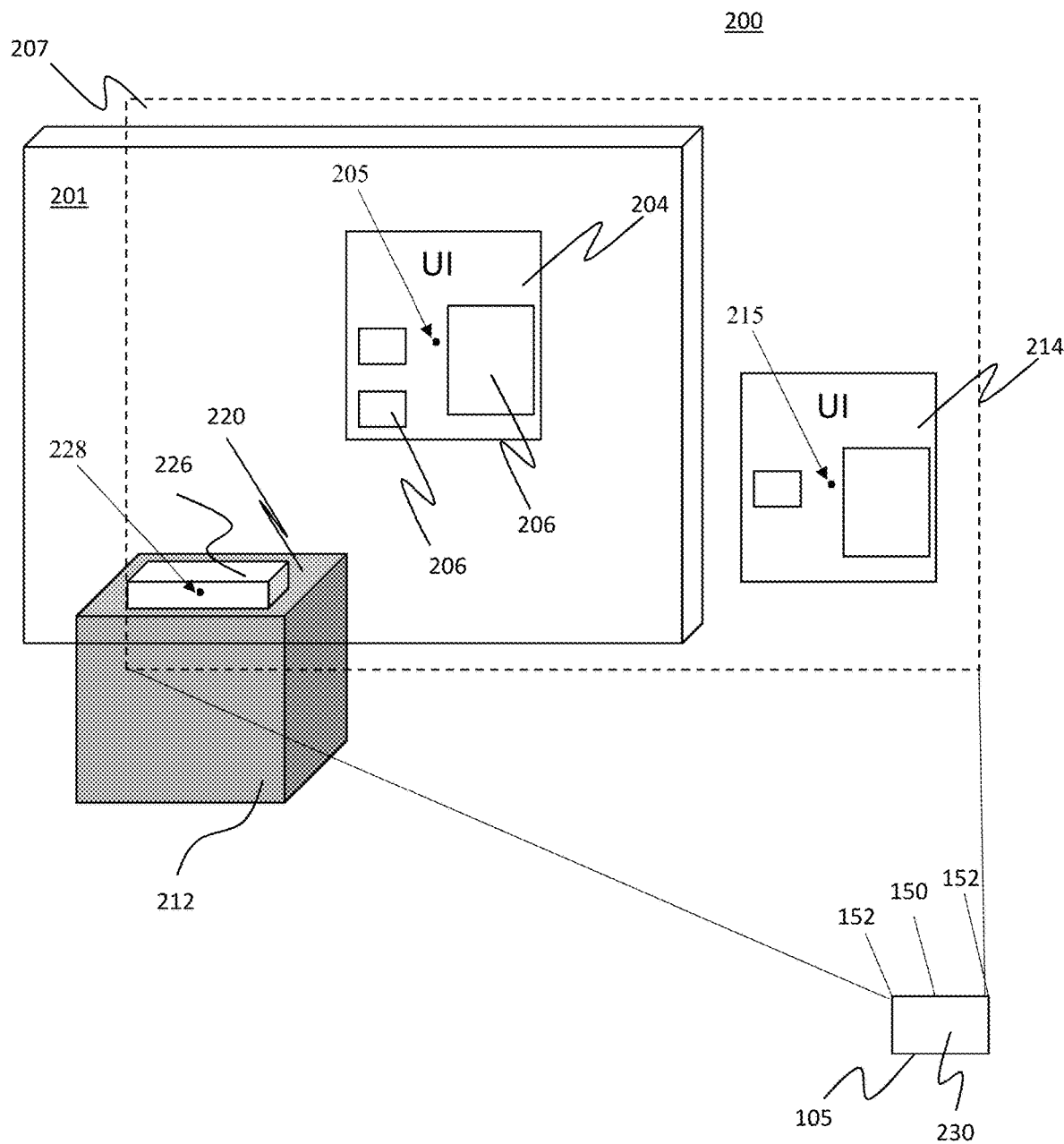
FIG. 2 illustrates an example of an extended reality environment including multiple user interfaces displayed, by an electronic device, to appear at multiple respective locations in a physical environment in accordance with aspects of the subject technology.

FIG. 2 illustrates an example of a physical environment 200 in which the electronic device 105 may be operated. In the example of FIG. 2, the electronic device 105 (e.g., display 230 of the electronic device 105) displays virtual content to be perceived by a user viewing the display 230 of the electronic device 105 at various locations in the physical environment 200 (e.g., at anchor locations determined by the electronic device). When the virtual content is displayed by the electronic device 105 that causes the virtual content to appear to the user to be in the physical environment 200, the combined physical environment and the virtual content may form an XR environment.

In the example of FIG. 2, the display 230 of electronic device 105 displays a user interface (UI) 204 of an application running on the electronic device 105. In this example, the displayed location of the UI 204 on the display 230 is anchored, by the electronic device 105, to a physical anchor location 205, such that the UI 204 displayed in the viewable area 207 of the display 230 appears to the user as if disposed on a physical wall 201 in the physical environment 200. As shown in FIG. 2, UI 204 may include one or more elements 206. Elements 206 may include text entry fields, buttons, selectable tools, scrollbars, menus, drop-down menus, links, plugins, image viewers, media players, sliders, gaming characters, other virtual content, or the like.

In the example of FIG. 2, UI 204 is displayed in the viewable area 207 of the display 230 of the electronic device 105 to appear, in an extended reality environment generated in part by electronic device 105, as if attached to the physical wall 201 in the physical environment 200. In the example of FIG. 2, the electronic device 105 also displays a UI 214 (e.g., a UI of another application running on the electronic device and displayed at another location within the viewable area 207 of the display 230) to be perceived by the user at another location in the physical environment. In this example, the UI 214 is anchored to a virtual anchor location 215 (e.g., an anchor location in the physical environment unassociated with a physical object), and appears as a floating UI in the physical environment 200.

In the example of FIG. 2, a physical table 212 is also present in the physical environment 200. In this example, the electronic device 105 also displays a UI 226 (e.g., a UI of yet another application running on the electronic device and displayed at yet another location within the viewable area 207 of the display 230) to be perceived by the user on a surface 220 of the physical table 212 in the physical environment 200. For example, the displayed location of the UI 226 on the display 230 may be anchored, by the electronic device 105, to a physical anchor location 228 on the surface 220 of the physical table 212. In one or more implementations, the UI 226 may include a virtual game board (e.g., a virtual chess board, a virtual checkers board, or other virtual board game setup), a virtual keyboard, a virtual character (e.g., a virtual animal, person, or fantastical character), or any other virtual object.

In various implementations, the physical anchor locations 205 and 228, and/or the virtual anchor location 215, may be generated by each applications for it's corresponding UI, or may be generated by a system process of the electronic device 105 on behalf of an application, based on scene information obtained using camera(s) 150 and/or sensor(s) 152 of the electronic device. However, in many use cases, it may be undesirable to allow the applications underlying the UI 204, the UI 214, and/or the UI 226 to access some or all of the scene information that describes the content of the physical environment 200, and/or to access some or all of the user information such as user gestures performed in the physical environment.

For example, it may be generally undesirable to allow an application to obtain image information, sensor information, and/or scene information based on the image information and/or sensor information, that describes the entire physical environment 200. This is because the physical environment 200 may include user-specific information and/or objects. As another example, it may be desirable to prevent one application from receiving gesture-input information and/or voice-input information being provided to the UI of another application. For example, in one illustrative use case, the UI 204 may be a UI of a banking application, and the UI 214 may be a UI of a social media application. In this illustrative use case, when the user performs gestures or other inputs to the banking application (e.g., to enter private and/or sensitive banking information, such as account numbers and/or passwords), it may be desirable to prevent the social media application from receiving gesture information associated with those gestures.

However, because, in an extended reality environment, the user may be not physically touching any physical sensors (e.g., touch sensors) co-located with the display pixels displaying the UI, it can be difficult to determine which UI(s) (e.g., and which underlying application(s)) should receive the user input and/or other scene information associated with the physical environment 200.

Aspects of the subject technology can facilitate the concurrent operation of multiple applications, based on scene information for the physical environment 200 and/or user information such as gesture information, while protecting the privacy of personally identifiable scene information and/or user information. For example, the electronic device 105 may only allow each application running on the device to obtain scene information and/or user information (e.g., gesture information and/or gaze information) that occurs and/or originates within a subset of the physical environment that has been assigned to that application.

Figure 3:
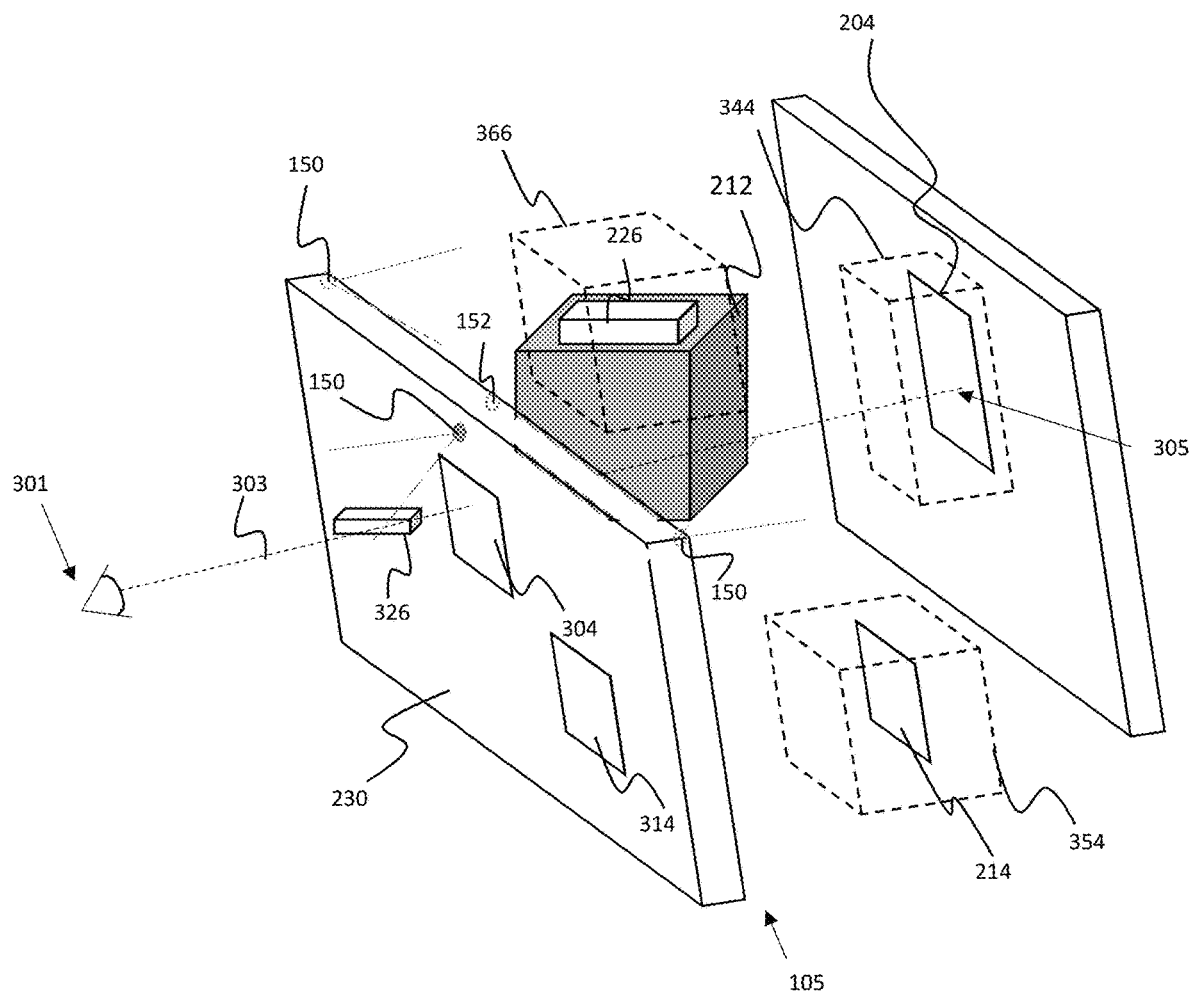
FIG. 3 illustrates various portions of the physical environment of FIG. 2 assigned for various user interfaces displayed to appear in the physical environment in accordance with one or more implementations.

For example, FIG. 3 illustrates an example in which, for each UI (e.g., and each underlying application), the electronic device 105 (e.g., a system process of the electronic device 105) assigns a portion of the physical environment 200 that includes the location, remote from the electronic device 105, at which the UI appears to be displayed (e.g., at which the display 230 causes the UI to be perceived by a user of the electronic device 105, even though no physical display may be occurring at the perceived/apparent location).

In the example of FIG. 3, the display 230 of the electronic device 105 displays a representation 304 of the UI 204, displayed at a location on the display 230 that causes the UI 204 to appear, to a user viewing the display 230, on the physical wall 201 behind the display 230. As shown, the display 230 of the electronic device 105 also displays a representation 314 of the UI 214, displayed at a location on the display 230 that causes the UI 214 to appear to be a floating UI, and a representation 326 of the UI 226, displayed at a location on the display 230 that causes the UI 226 to appear to be located on the physical table 212. In various implementations as described herein, the display 230 can be a transparent or translucent display that allows the user to view the physical environment directly through the viewable area of the display, or the display may be a pass-through video display that captures images of the physical environment and displays representations of physical environment objects on the display 230 along with the device-generated content (e.g., including the representations 304, 314, and 326 of the UIs 204, 214, and 226 in this example).

As illustrated in FIG. 3, the electronic device may assign a portion 344 of the physical environment 200, including the location at which the UI 204 is displayed to appear, to the application that provides the UI 204. In this example, the electronic device 105 also assigns a portion 354 of the physical environment 200, including the location at which the UI 214 is displayed to appear, to the application that provides the UI 214, and assigns a portion 366 of the physical environment 200, including the location at which the UI 226 is displayed to appear, to the application that provides the UI 226. In the example of FIG. 3, the portions 344, 354, and 366 of the physical environment 200 are rectilinear three-dimensional volumes within the physical environment. However, it is also appreciated that a portion of a physical environment that is assigned to an application can have any suitable size or shape, and can also be adjustable and/or changeable based on the size, shape, location, and/or content of the corresponding UI, and/or based on the scene information for the physical and/or XR environment (e.g., based on the presence of physical and/or virtual objects, including other UIs) in the vicinity of the assigned portion of the physical environment.

The electronic device 105 may obtain (e.g., using camera(s) 150 and/or sensor(s) 152) scene information corresponding to the physical environment 200 of the electronic device 105. For example, the system process may detect and/or identify physical objects in the physical environment 200, generate a three-dimensional map of the physical environment 200, and/or obtain other scene information describing the physical characteristics of the physical environment 200. The electronic device 105 may determine, for each of the UI 204, the UI 214, and the UI 226, a respective subset of the scene information that corresponds to the portion 344, the portion 354, and the portion 366 of the physical environment 200.

The electronic device 105 may provide, by the system process, the subset of the scene information for each application, to that application, without providing a remaining portion of the scene information to the application. The subset of the scene information that corresponds to a particular portion (e.g., the portion 344, the portion 354, and the portion 366) of the physical environment 200 may include the location of anchors (e.g., physical and/or virtual anchors), and/or the location, type, images, and/or other characteristics of one or more physical objects within that portion of the physical environment. For example, the application that generates the UI 204 may be informed of the presence of the physical wall 201, or a portion thereof, but not be informed of the presence of the physical table 212. As another example, the application that generates the UI 226 may be informed of the presence of the physical table 212, or a portion (e.g., a surface) thereof, but not be informed of the presence of the physical wall 201.

As discussed herein, the electronic device 105 may also provide only a subset of user information obtained by the electronic device to each application. For example, while operating the electronic device 105, the user may look around the physical environment 200, including looking at the UI 204, the UI 214, and/or the UI 226 at various times. The user may also move within the physical environment 200, including performing hand gestures that correspond to gesture inputs to the UI 204, the UI 214, and/or the UI 226 at various times, and/or performing hand movements that are unassociated with gesture inputs to the electronic device 105. In one or more implementations, the electronic device 105 may only provide gesture information to the applications corresponding to the UI 204, the UI 214, and/or the UI 226 when a gesture input occurs within the respective portion 344, 354, and/or 366 for that UI.

As another example, FIG. 3 illustrates how an eye 301 of a user can have a line of sight (e.g., a gaze direction 303) that intersects with the UI 204. Although only a single gaze direction 303 for a single eye 301 is illustrated in FIG. 3, it is appreciated that, by obtaining gaze directions for both eyes of a user, the electronic device 105 can determine a gaze location 305 (e.g., a three-dimension gaze location) on which the user's gaze is landing at any given time. In this example, the electronic device 105 may determine that the gaze location 305 is within the portion 344 of the physical environment, and provide gaze information (e.g., the gaze location) to the application corresponding to the UI 204. In this example, no gaze information is provided to the applications corresponding to the UI 214 or the UI 226 (e.g., until the user's gaze moves to position the gaze location 305 within the portion 354 or the portion 366 of the physical environment). In this way, only the scene information and/or user information that is used by an application for its own operations are provided to that application by the electronic device 105.

Figure 4:
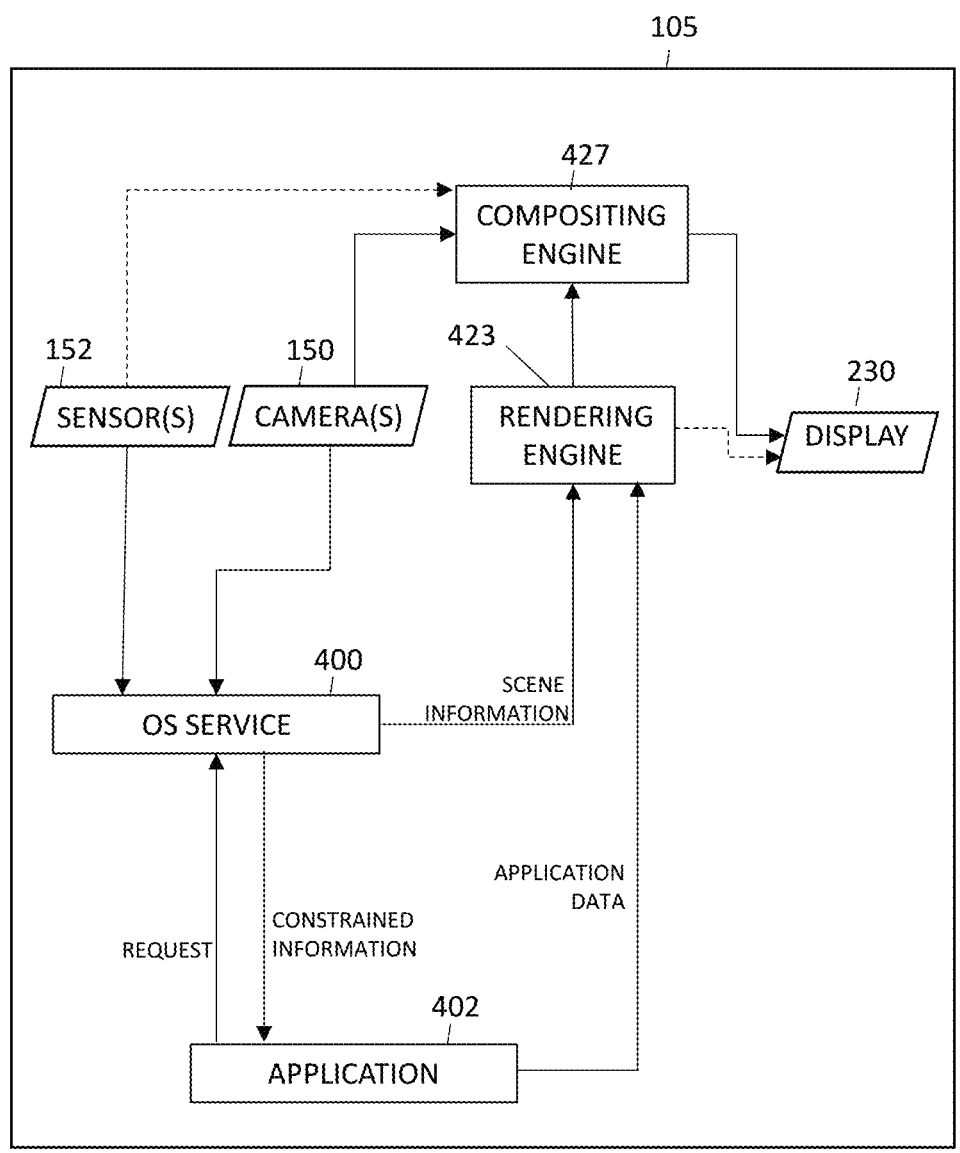
FIG. 4 illustrates an example electronic device providing constrained access to scene information in accordance with one or more implementations.

FIG. 4 illustrates how a system process of the electronic device 105 may control (e.g., constrain) the access, by various applications, to scene information and/or user information. For example, FIG. 4 illustrates an example architecture that may be implemented by the electronic device 105 in accordance with one or more implementations of the subject technology. For explanatory purposes, portions of the architecture of FIG. 4 are described as being implemented by the electronic device 105 of FIG. 1, such as by a processor and/or memory of the electronic device; however, appropriate portions of the architecture may be implemented by any other electronic device, including the electronic device 110, electronic device 115, and/or server 120. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of the architecture of FIG. 4 can be implemented in software or hardware, including by one or more processors and a memory device containing instructions, which when executed by the processor cause the processor to perform the operations described herein. For example, in FIG. 4, the trapezoidal boxes may indicate that the sensors 152, the camera(s) 150 and the display 230 may be hardware components, and the rectangular boxes may indicate that the OS service 400, the application 402, the rendering engine 423, and the compositing engine 427 may be implemented in software, including by one or more processors and a memory device containing instructions, which when executed by the processor cause the processor to perform the operations described herein.

In the example of FIG. 4, an application such as application 402 (e.g., an application having a UI 204, as illustrated in FIGS. 2 and 3) provides application data to a rendering engine 423 for rendering of the application data, such as for rendering of the UI 204 of the application. Application 402 may be a gaming application, a media player application, a content-editor application, a training application, a simulator application, a social media application, or generally any application that provides a UI or other content for display at a location that depends on the physical environment, such as by anchoring the UI or other content to an anchor in the physical environment. The application data may include application-generated content (e.g., windows, buttons, tools, characters, images, videos, etc.) and/or user-generated content (e.g., text, images, etc.), and information for rendering the content in the UI. In one or more implementations, rendering engine 423 renders the UI 204 for display by a display such as display 230 of the electronic device 105. In one or more implementations, the OS service 400 may assign a portion of a physical environment of the electronic device (e.g., the portion 344 of the physical environment 200, as in the example of FIG. 3), to the application 402 (e.g., while the application 402 is running on the electronic device 105 and while the UI 204 is displayed by the display 230).

As shown in FIG. 4, additional information may be provided for display of the UI of the application 402, such as in a two-dimensional or three-dimensional (e.g., XR) scene (e.g., as in the examples of FIGS. 2 and 3). In the example of FIG. 4, sensors 152 may provide physical environment information (e.g., depth information from one or more depth sensors, motion information from one or more motion sensors), and/or user information to an OS service 400. Camera(s) 150 may also provide images of a physical environment and/or one or more portions of the user (e.g., the user's eyes, hands, face, etc.) to OS service 400. OS service 400 may generate scene information, such as three-dimensional map, of some or all of the physical environment of electronic device 105 using the environment information (e.g., the depth information and/or the images) from sensors 152 and camera(s) 150. The OS service 400 may also determine a gaze location, such as gaze location 305 of FIG. 3, based on images and/or other sensor data representing the position and/or orientation of the user's eye(s). The OS service 400 may also identify a gesture (e.g., a hand gesture) performed by a user of the electronic device 105, based on images and/or other sensor data representing the position and/or orientation of the user's hand(s) and/or arm(s).

As illustrated in FIG. 4, in one or more implementations, the application 402 may provide a request to the OS service 400. For example, the request may be a request for scene information (e.g., information describing the content of the physical environment), and/or a request for user information such as a request for a gaze location and/or user gesture information. In one example, the request may be an anchor request for a physical anchor (e.g., a horizontal surface, a vertical surface, a floor, a table, a wall, etc.).

As indicated in FIG. 4, the OS service 400 may provide constrained information to the application 402. In various implementations, the constrained information may be provided in response to the request from the application 402 or may be provided without an explicit request from the application 402. The constrained information may include scene information and/or user information that corresponds to the portion 344 of the physical environment that has been assigned to the application 402 (e.g., by the OS service 400).

Application 402 may include code that, when executed by one or more processors of electronic device 105, generates application data, for display of the UI 204 on, near, attached to, or otherwise associated with an anchor location corresponding to the anchor identified by the identifier provided from OS service 400. Application 402 may include code that, when executed by one or more processors of electronic device 105, modifies and/or updates the application data based on user information (e.g., a gaze location and/or a gesture input) provided by the OS service 400.

Once the application data has been generated, the application data can be provided to the OS service 400 and/or the rendering engine 423, as illustrated in FIG. 4. As shown, scene information can also be provided to rendering engine 423. The scene information provided from the OS service 400 to the rendering engine 423 can include or be based on, as examples, environment information such as a depth map of the physical environment, and/or object information for detected objects in the physical environment. Rendering engine 423 can then render the application data from application 402 for display by display 230 of electronic device 105 to appear at a desired location in the physical environment 200. For example, the representation 304 of the UI 204 may be rendered for display at the appropriate location on the display 230, to appear to be located at a desired location in the physical environment 200, using the application data (which may be based on constrained scene information corresponding to the portion 344 of the physical environment) and using the scene information from the OS service 400 (which may include scene information for other portions of the physical environment). Display 230 may be, for example, an opaque display, and camera(s) 150 may be configured to provide a pass-through video feed to the opaque display. The UI 204 may be rendered for display at a location on the display corresponding to the displayed location of a physical anchor object in the pass-through video. Display 230 may be, as another example, a transparent or translucent display. The UI 204 may be rendered for display at a location on the display corresponding to a direct view, through the transparent or translucent display, of the physical environment 200.

As shown, in one or more implementations, electronic device 105 can also include a compositing engine 427 that composites video images of the physical environment, based on images from camera(s) 150, for display together with the UI 204 from rendering engine 423. For example, compositing engine 427 may be provided in an electronic device 105 that includes an opaque display, to provide pass-through video to the display. In an electronic device 105 that is implemented with a transparent or translucent display that allows the user to directly view the physical environment, compositing engine 427 may be omitted or unused in some circumstances, or may be incorporated in rendering engine 423. Although the example of FIG. 4 illustrates a rendering engine 423 that is separate from OS service 400, it should be appreciated that OS service 400 and rendering engine 423 may form a common service and/or that rendering operations for rendering content for display can be performed by the OS service 400. Although the example of FIG. 4 illustrates a rendering engine 423 that is separate from application 402, it should be appreciated that, in some implementations, application 402 may render content for display by display 230 without using a separate rendering engine. Although a single application 402 is depicted in FIG. 4, it is appreciated that multiple applications may be running concurrently on the electronic device 105, receiving constrained information corresponding to respective portions of the physical environment, and generating application data for rendering of respective UIs for display (e.g., concurrent display as in the examples of FIGS. 2 and 3) by display 230.

Figure 5:
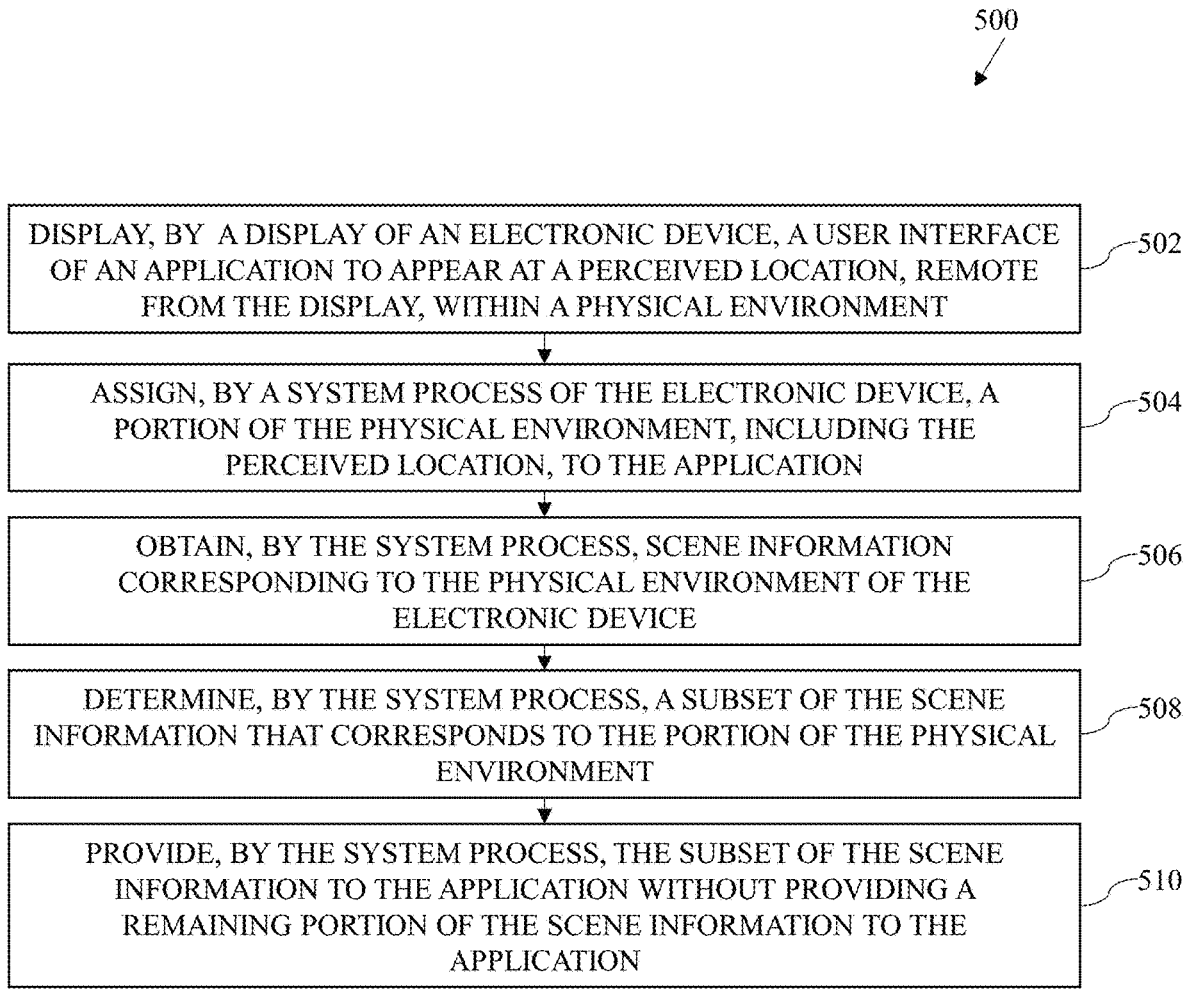
FIG. 5 illustrates a flow diagram of an example process for constraining scene information access according to aspects of the subject technology.

FIG. 5 illustrates a flow diagram of an example process 500 for providing constrained access to scene information in accordance with implementations of the subject technology. For explanatory purposes, the process 500 is primarily described herein with reference to the electronic device 105 of FIG. 1. However, the process 500 is not limited to the electronic device 105 of FIG. 1, and one or more blocks (or operations) of the process 500 may be performed by one or more other components of other suitable devices, including the electronic device 104, the electronic device 110, and/or the electronic device 115. Further for explanatory purposes, some of the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

As illustrated in FIG. 5, at block 502, a display (e.g., display 230) of an electronic device (e.g., electronic device 105) may display a user interface (e.g., UI 204) of an application (e.g., application 402) to appear at a perceived location (e.g., physical anchor location 205), remote from the display, within a physical environment (e.g., physical environment 200). For example, the electronic device may render a representation 304 of the UI 204 and display the representation 304 on the display 230 to appear to be located at a desired three-dimensional location in the physical environment (e.g., as described herein in connection with FIG. 3). For example, by adjusting the relative positions of a right-eye portion of the representation 304 and a left eye portion of the representation 304, the electronic device 105 can control the depth at which the UI 204 appears, remote from the electronic device 105 in the physical environment, to the user. In one or more implementations, displaying the user interface of the application to appear at the perceived location within a physical environment may include receiving user interface information (e.g., application data as described herein in connection with FIG. 4) for the user interface at the system process from the application in system units (e.g., non-physical digital units), and determining a scaling between the system units and physical units in the physical environment, based in part on the scene information for the physical environment. For example, the system process may determine, based on a location for the display of the UI 204, and/or other physical and/or virtual content in the vicinity of the UI 204, a scaling between the system units and the physical units, to display the UI 204 at a desired perceived location, orientation, and/or size. This use of system units by the application can facilitate, for example, the OS service 400 allowing the user to pull the UI 204 closer or move the UI 204 further away, without requiring processing operations by the application.

At block 504, a system process (e.g., OS service 400) of the electronic device may assign a portion (e.g., portion 344) of the physical environment, including the perceived location, to the application. For example, the portion of the physical environment may be a three-dimensional region within the physical environment, as illustrated in FIG. 3. As an example, the subset of the scene information may include a location of a surface a physical object (e.g., a surface of a physical wall such as the physical wall 201 of FIGS. 2 and 3, the surface 220 of a physical table such as physical table 212 of FIGS. 2 and 3, a surface of floor, a desk, a window, a wall, or the like) within the portion of the physical environment. As another example, the subset of the scene information may include a physical anchor (e.g., a physical anchor location 205 or a physical anchor location 228) for virtual content (e.g., included in the UI 204) generated by the application, the physical anchor located within the portion of the physical environment.

At block 506, the system process may obtain scene information corresponding to the physical environment of the electronic device. For example, the system process may obtain one or more images of the physical environment (e.g., using camera(s) 150) and/or other sensor information (e.g., from one or more sensors 152). The scene information may include the images and/or the sensor information, and/or information derived from the images and/or sensor information, such as information describing the content of the physical environment. For example, the scene information may include a depth map of the physical environment, identifiers, types, and/or locations of one or more objects (e.g., physical walls such as physical wall 201, physical tables such as physical table 212, and/or other physical objects), identifiers, types, and/or locations of one or more living beings (e.g., other people and/or pets in the physical environment), and/or any other information that describes aspects of the physical environment.

At block 508, the system process may determine a subset of the scene information that corresponds to the portion (e.g., the portion 344) of the physical environment. In one or more implementations, prior to the determining, the system process may receive, from the application, a request for the scene information (e.g., as described herein in connection with FIG. 4). For example, the request may include a request for a physical anchor for virtual content (e.g., the UI 204) generated by the application, and the process 500 may also include determining, by the system process using the scene information, that the physical anchor exists in the physical environment outside the portion of the physical environment, identifying, by the system process using the scene information, a different anchor within the portion of the physical environment for the virtual content, and providing the different anchor to the application as the subset of the scene information.

For example, in one illustrative use case, an application 402 corresponding to the UI 214 may request a vertical wall for the anchoring the UI 214. The system process (e.g., OS service 400) may determine that a wall exists, but is occupied by the UI 204, and identify and provide the virtual anchor location 215 to the application instead of providing a physical anchor location on the wall to the application. In this way, the application 402 corresponding to the UI 214 may be provided with scene information (e.g., the virtual anchor location 215) within the portion 354 of the physical environment, without providing the application 402 corresponding to the UI 214 with any scene information outside the portion 354 (e.g., without notifying the application that the physical wall 201 exists but is unavailable) or any information associated with the UI 204 or its underlying application. In this way, the application 402 corresponding to the UI 214 receives sufficient scene information to operate the application, without exposing the full scene information, or information associated with other applications, to the application.

At block 510, the system process may provide the subset of the scene information to the application, without providing a remaining portion of the scene information to the application. In one or more implementations, one or more subsets of the remaining portion of the scene information (e.g., subsets corresponding to the portions 354 and 366 of the physical environment) may be provided to one or more other applications running on the electronic device (e.g., applications corresponding to the UIs 214 and 226). In one or more implementations, the process 500 may also include operating the application using the portion of the scene information (e.g., to generate an update to the UI).

In one or more implementations, obtaining the scene information corresponding to the physical environment of the electronic device may include obtaining the scene information in a global coordinate system for the physical environment, and providing the subset of the scene information to the application may include providing the subset of the scene information in an application-specific coordinate system different from the global coordinate system. For example, the system process may translate global coordinates (e.g., relative to an origin in the physical environment) of a physical object or location in the physical environment 200 into application-specific coordinates (e.g., relative to a different origin in application space), and provide the translated application-specific coordinates to the application. In this way, each application running on the electronic device can operate, using scene information from the physical environment, in its own local coordinate system. The system process can then translate application data received from the application in application-specific coordinates back into the global coordinates for rendering and display of the application data.

In one or more implementations, the system process may also constrain user information that is provided to the application. For example, the system process may also detect a gesture performed by a user of the electronic device within the portion of the physical environment, and provide gesture information for the gesture to the application. The application can then process the gesture information as a gesture input from the user for controlling the application. The system process may also detect another gesture performed by the user of the electronic device outside the portion of the physical environment (e.g., a non-input gesture as part of the normal body movement of the user, or a gesture input to another application, such as a gesture input within the portion 354 or the portion 366 of the physical environment 200). In this example, the system process does not provide the gesture information associated with the other gesture to the application.

As another example, the system process may detect a gaze location (e.g., a gaze location 305) within the portion (e.g., the portion 344) of the physical environment, and provide the gaze location to the application. In one or more implementations, the gaze location may be obscured before providing the gaze location to the application, even if the gaze location is within the portion 344 of the physical environment corresponding to the application. For example, a gaze region having lower accuracy than the gaze location may be provided, or an indication that the gaze location is within the portion 344 or intersecting with the UI 204 or a portion thereof may be provided to the application. The system process may also detect another gaze location outside the portion of the physical environment, and not provide the other gaze location to the application. For example, the user of the electronic device 105 may move their eyes to look away from the UI 204 toward the UI 214. The system process may stop providing gaze information to the application corresponding to the UI 204 when the gaze location moves out of the portion 344 of the physical environment 200 (e.g., and begin providing gaze information to the application corresponding to the UI 214 when the gaze location moves into the portion 354 of the physical environment).

In one or more implementations, the process may also include detecting, by the system process, a living being within the portion of the physical environment, and temporarily suspending providing the subset of the scene information to the application while the living being is within the portion of the physical environment. For example, while the UI 204 of FIG. 2 is displayed to appear at a perceived location on the physical wall 201 and within the portion 344 of the physical environment 200, a person or a pet may walk through the portion 344 of the physical environment 200. In order, for example, to protect the privacy of the person and/or the user, the system process may temporarily suspend providing scene information, even from within the application's portion 344 of the physical environment, to the application. The providing of the scene information may be suspended without providing a reason for the suspension to the application. For example, the application may be notified that scene information has been temporarily suspended, without including a reason for the suspension in the notification. In this way, the application is notified of the suspension without providing any information about the person or the pet to the application.

In one or more implementations, the process 500 may also include receiving, by the system process from the application, a request for an additional portion of the physical environment, and determining, by the system process, whether the additional portion of the physical environment is available for use by the application. For example, while an application may be assigned a portion of a physical environment around a location at which a UI for the application is displayed to appear, the application may, in some use cases, attempt to display additional application content to appear at another location in the physical environment. For example, an application having a UI corresponding to a virtual fish tank may attempt to display virtual content that modifies an apparent color of a physical wall disposed behind the virtual fish tank (e.g., to enhance the appearance of the virtual fish tank). In this example, the application may provide a request to the system process (e.g., the OS service 400) for a vertical wall or planar surface disposed behind the apparent location of the UI of that application in the physical environment.

In an example use case, determining whether the additional portion of the physical environment is available for use by the application may include determining that the additional portion of the physical environment is available for use by the application, and the system process may display additional user interface information (e.g., the wall color modifying virtual content in this example) for the application, to appear in the additional portion of the physical environment (e.g., on the physical wall). For example, the system process may determine that the additional portion of the physical environment is available for use by the application by detecting (e.g., using camera(s) 150 and/or sensor(s) 152) that a physical wall exists behind the apparent location of the UI of that application in the physical environment and that the physical wall is not occupied by the apparent display of a UI of another application. In this way, the application may be provided with the ability to ornament the UI of an application, using other portions of the physical environment.

In another example use case, determining whether the additional portion of the physical environment is available for use by the application may include determining that the additional portion of the physical environment is not available for use by the application, and the system process may provide a notification to the application that the request for the additional portion of the physical environment is denied. For example, the system process may determine that the additional portion of the physical environment is not available for use by the application by determining that no physical wall exists behind the apparent location of the UI of that application in the physical environment, and/or that a physical wall exists but the physical wall is occupied by the apparent display of a UI of another application. The system process may notify the application that the requested additional portion of the physical environment is not available, without including a reason in the notification as to why the additional portion of the physical environment is not available. In this way, the application is provided with the information to continue operating, without being provided with information associated with the physical environment outside the assigned portion of the physical environment or any information associated with any other application.

In one or more implementations, the process 500 may also include receiving, by the system process from the application, a request to modify an additional portion of the physical environment outside of the portion of the physical environment based on content of the user interface, and displaying, by the system process based in part on the content of the user interface, a modification to the additional portion of the physical environment outside of the portion of the physical environment. For example, displaying the modification to the additional portion of the physical environment outside of the portion of the physical environment may include generating, by the system process based in part the content of the user interface and in part on scene information corresponding to the additional portion of the physical environment of the electronic device and without providing the scene information corresponding to the additional portion of the physical environment, modification content for the modification to the additional portion of the physical environment.

In one example use case, a UI, such as UI 204, of an application having an assigned portion (e.g., portion 344) of the physical environment 200, may be a light-generating UI. A light-generating UI may be or include a virtual lamp or a virtual movie screen, or another UI that represents a physical object that generates light. In one or more implementations, the light-generating UI may request that the system process display casted light that appears to be generated by the UI within the assigned portion 344 of the physical environment 200 onto other portions of the physical environment 200 (e.g., in a halo around the light-generating UI, or in the way that physical light from a physical light-generated device, such as a physical lamp, a physical television screen, or a physical movie screen would cast light over the physical environment).

In one or more implementations, the system process (e.g., the OS service 400) may use scene information (e.g., a scene map) including scene information for portions of the physical environment outside the portion 344, along with application data indicating the light being generated by the light-generating UI (e.g., the content being displayed on a virtual television), and generate and display additional virtual content that creates the appearance of that generated light shining on the physical objects in the physical environment from the apparent location of the light-generating UI (e.g., including casting of shadows by physical objects in the path of the virtual light from the apparent location of the light-generating UI), rather than from the location of the electronic device 105.

As described above, aspects of the subject technology may include the collection of data. The present disclosure contemplates that in some instances, this collected data may include personal information data that uniquely identifies or can be used to identify a specific person. Such personal information data can include demographic data, location-based data, online identifiers, telephone numbers, email addresses, home addresses data, image data, audio data, environment data, or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for providing constrained access to scene information and/or user information by applications running on an electronic device. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of providing constrained access to scene information and/or user information by applications running on an electronic device, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 6:
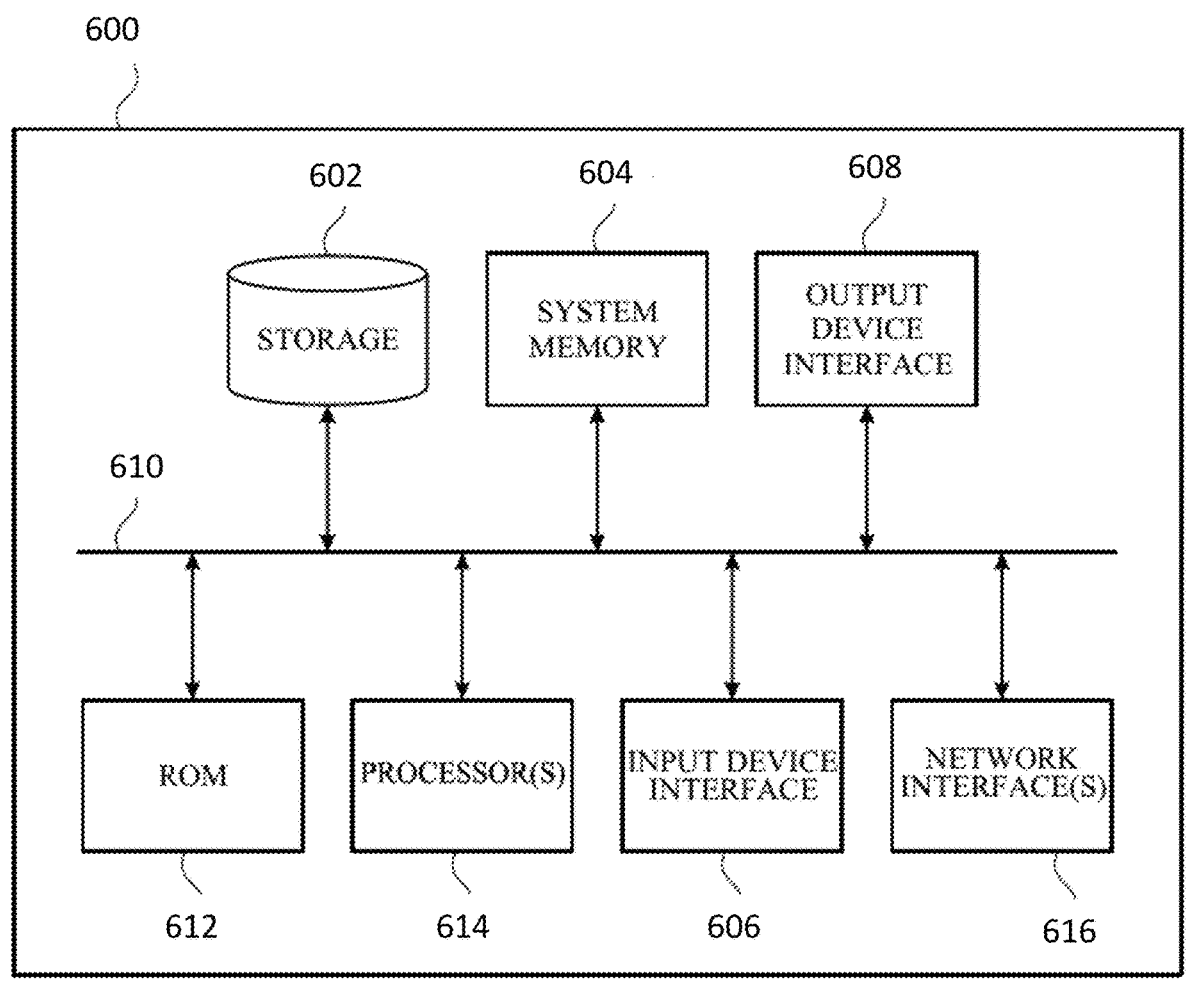
FIG. 6 illustrates an example computing device with which aspects of the subject technology may be implemented.

FIG. 6 illustrates an example computing device with which aspects of the subject technology may be implemented in accordance with one or more implementations. The computing device 600 can be, and/or can be a part of, any computing device or server for generating the features and processes described above, including but not limited to a laptop computer, a smartphone, a tablet device, a wearable device such as a goggles or glasses, and the like. The computing device 600 may include various types of computer readable media and interfaces for various other types of computer readable media. The computing device 600 includes a permanent storage device 602, a system memory 604 (and/or buffer), an input device interface 606, an output device interface 608, a bus 610, a ROM 612, one or more processing unit(s) 614, one or more network interface(s) 616, and/or subsets and variations thereof.

The bus 610 collectively represents all system, peripheral, and chipset buses that communicatively connect the numerous internal devices of the computing device 600. In one or more implementations, the bus 610 communicatively connects the one or more processing unit(s) 614 with the ROM 612, the system memory 604, and the permanent storage device 602. From these various memory units, the one or more processing unit(s) 614 retrieves instructions to execute and data to process in order to execute the processes of the subject disclosure. The one or more processing unit(s) 614 can be a single processor or a multi-core processor in different implementations.

The ROM 612 stores static data and instructions that are needed by the one or more processing unit(s) 614 and other modules of the computing device 600. The permanent storage device 602, on the other hand, may be a read-and-write memory device. The permanent storage device 602 may be a non-volatile memory unit that stores instructions and data even when the computing device 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 614 may need at runtime. In one or more implementations, the processes of the subject disclosure are stored in the system memory 604, the permanent storage device 602, and/or the ROM 612. From these various memory units, the one or more processing unit(s) 614 retrieves instructions to execute and data to process in order to execute the processes of one or more implementations.

The bus 610 also connects to the input and output device interfaces 606 and 608. The input device interface 606 enables a user to communicate information and select commands to the computing device 600. Input devices that may be used with the input device interface 606 may include, for example, alphanumeric keyboards and pointing devices (also called "cursor control devices"). The output device interface 608 may enable, for example, the display of images generated by computing device 600. Output devices that may be used with the output device interface 608 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 610 also couples the computing device 600 to one or more networks and/or to one or more network nodes through the one or more network interface(s) 616. In this manner, the computing device 600 can be a part of a network of computers (such as a LAN, a wide area network ("WAN"), or an Intranet, or a network of networks, such as the Internet. Any or all components of the computing device 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   obtaining, by an electronic device, scene information corresponding to a physical environment of the electronic device;
   determining a subset of the scene information that corresponds to a portion of the physical environment that has been assigned to an application at the electronic device; and
   providing the subset of the scene information to the application without providing a remaining portion of the scene information to the application.

2. The method of claim 1, wherein the portion of the physical environment includes a perceived location of a user interface of the application.

3. The method of claim 2, further comprising displaying, by a display of the electronic device, the user interface of the application to appear at the perceived location, remote from the display, within the portion of the physical environment.

4. The method of claim 3, wherein displaying the user interface of the application to appear at the perceived location within the physical environment comprises:
   receiving user interface information for the user interface at a system process from the application in system units; and
   determining a scaling between the system units and physical units in the physical environment, based in part on the scene information for the physical environment.

5. The method of claim 1, wherein the portion of the physical environment comprises a three-dimensional region within the physical environment.

6. The method of claim 1, further comprising:
   detecting a living being within the portion of the physical environment; and
   temporarily suspending providing the subset of the scene information to the application while the living being is within the portion of the physical environment.

7. The method of claim 1, further comprising:
   receiving from the application, a request for an additional portion of the physical environment; and
   determining whether the additional portion of the physical environment is available for use by the application.

8. The method of claim 7, wherein determining whether the additional portion of the physical environment is available for use by the application comprises determining that the additional portion of the physical environment is available for use by the application, the method further comprising:
displaying additional user interface information for the application to appear at an additional perceived location in the additional portion of the physical environment.

9. The method of claim 7, wherein determining whether the additional portion of the physical environment is available for use by the application comprises determining that the additional portion of the physical environment is not available for use by the application, the method further comprising:
providing a notification to the application that the request for the additional portion of the physical environment is denied.

10. The method of claim 1, further comprising:
receiving from the application, a request to modify an additional portion of the physical environment outside of the portion of the physical environment based on content of a user interface of the application; and
displaying based in part on content of the user interface, a modification to the additional portion of the physical environment outside of the portion of the physical environment.

11. The method of claim 10, wherein displaying the modification to the additional portion of the physical environment outside of the portion of the physical environment comprises generating, based in part on the content of the user interface and in part on scene information corresponding to the additional portion of the physical environment of the electronic device and without providing the scene information corresponding to the additional portion of the physical environment, modification content for the modification to the additional portion of the physical environment.

12. A method, comprising:
providing, by an application at an electronic device, a request for scene information corresponding to a physical environment of the electronic device; and
receiving, by the application, a subset of the scene information, without receiving a remaining portion of the scene information,
wherein the subset of the scene information corresponds to a portion of the physical environment that has been assigned to the application, the portion including a perceived location of a user interface of the application.

13. The method of claim 12, wherein the request comprises a request for a physical anchor for virtual content generated by the application, wherein the physical anchor exists in the physical environment outside the portion of the physical environment, and wherein the method further comprises:
receiving, by the application, a different anchor within the portion of the physical environment as the subset of the scene information.

14. The method of claim 12, wherein the subset of the scene information comprises a location of a surface a physical object within the portion of the physical environment.

15. The method of claim 12, wherein the subset of the scene information comprises a physical anchor for virtual content generated by the application, the physical anchor located within the portion of the physical environment.

16. The method of claim 12, wherein the subset of the scene information comprises gesture information for a gesture performed by a user of the electronic device within the portion of the physical environment, and wherein the remaining portion of the scene information comprises another gesture performed by the user of the electronic device outside the portion of the physical environment.

17. The method of claim 12, wherein the subset of the scene information comprises a gaze location within the portion of the physical environment, and wherein the remaining portion of the scene information comprises another gaze location outside the portion of the physical environment.

18. The method of claim 12, wherein receiving the subset of the scene information comprises receiving the subset of the scene information in an application-specific coordinate system that is different from a global coordinate system of a system process at the electronic device.

19. The method of claim 12, further comprising operating the application using the portion of the scene information.

20. A device, comprising:
a memory; and
one or more processors configured to:
obtain scene information corresponding to a physical environment of the device;
determine a subset of the scene information that corresponds to a portion of the physical environment that has been assigned to an application at the device, the portion including a perceived location of a user interface of the application; and
provide the subset of the scene information to the application without providing a remaining portion of the scene information to the application.

* * * * *